Dec. 30, 1958  H. S. WHITEHEAD  2,866,934
DIRECTIONAL SYSTEMS SENSITIVE TO RATES OF TURN
Filed Sept. 6, 1957  2 Sheets-Sheet 1
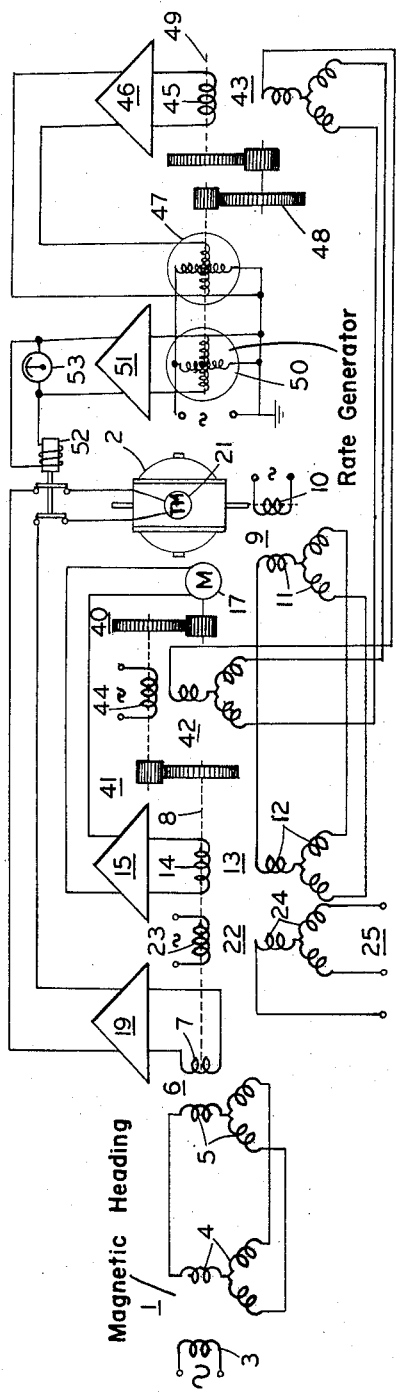
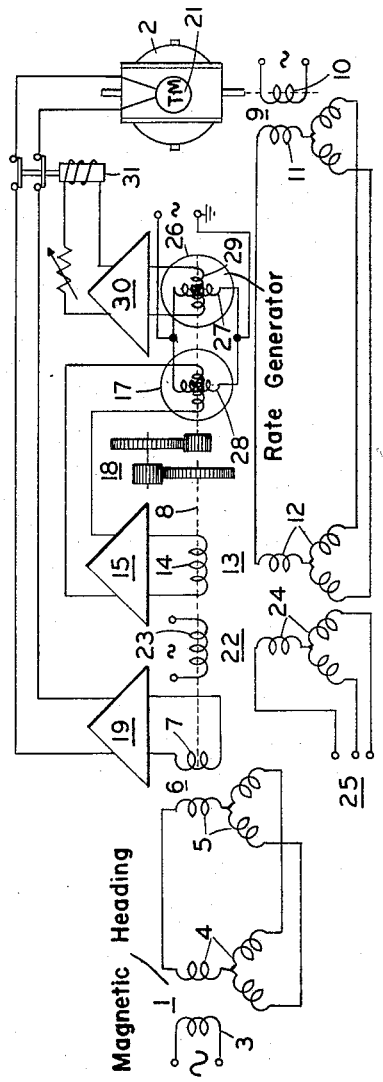
Inventor:
Harold S. Whitehead
by Richard E. Hosley
His Attorney Inventor:
Harold S. Whitehead United States Patent Office 2,866,934
Patented Dec. 30, 1958

2,866,934

DIRECTIONAL SYSTEMS SENSITIVE TO RATES OF TURN

Harold S. Whitehead, Marblehead, Mass., assignor to General Electric Company, a corporation of New York Application September 6, 1957, Serial No. 682,460

9 Claims. (Cl. 318—489)

This invention relates to inertial directional reference systems and, more particularly, to means for deriving a functional rate-of-turn signal from inertial directional reference systems.

In a compass-controlled directional gyro system, control of the attitude or orientation of the inertial elements of the sytem is commonly effected by torque motors which cause the inertial elements to return to predetermined orientations upon departure therefrom. Departure of the spin axis of a directional gyroscope, for example, from its correct azimuthal orientation may be sensed by a magnetic compass detector and associated equipment, whereupon processional torques are applied about the minor axis of the gyro rotor suspension, to cause movement of the rotor about the major axis until the position of the gyro is corrected. Again, if the spin axis wanders from its normally horizontal plane, corrective torques are brought into play to return the spin axis to its normally horizontal position by means which are sensitive either to gravity or to the relative position of the instrument frame.

Inertially stabilized platforms or "stable tables" also require some sort of control to correct for wandering of the platform from an original orientation. Changes in the azimuthal orientation of a stable platform, however, are usually compensated for by inserting a differential control transformer in the servo follow-up system and by rotating one of the control transformer windings to compensate for azimuthal drift. With such an arrangement, no attempt is made to slave the platform itself to a particular heading, for the differential control transformer is slaved instead. Levelling, however, may be accomplished in much the same manner as on a directional gyroscope.

It is common knowledge that during turns of an aircraft carrying such directional systems, various forces result which may cause erroneous corrective torques or forces to be applied. For example, during a turn the magnetic field detector may be caused to assume positions in which non-horizontal components of the earth's magnetic field are sensed, resulting in erroneous azimuthal information and incorrect slaving control. Similarly, the levelling means employed to detect and control the horizontal attitude of the inertial elements are subject to erroneous operation during turns. It is well known therefore to provide some arrangement for interrupting the slaving and levelling forces in an inertial directional system during turns exceeding a certain predetermined rate to prevent the introduction of unwanted errors into the system. This may be accomplished by opening circuit connections anywhere between the primary sensing means and the force- or torque-applying apparatus.

The means employed for sensing turns and interrupting slaving and levelling torques is usually a separate rate gyroscope with associated electrical contacts, numerous examples of which may be found in the patent literature. The rate gyroscope is usually gimballed for one degree of rotational freedom at right angles to its spin axis and is constrained by springs toward a normal position. Turning of the craft on which the rate gyro is suspended causes the main gimbal to tilt against the force of the springs, and if the rate of turn exceeds a certain predetermined magnitude, electrical contacts associated with the gimbal are caused to open, de-energizing the torque motors and halting the application of corrective forces. Rate gyros, even in their crudest forms, add considerably to the cost of a directional system.

It is one object of this invention to provide in an inertial directional system means for interrupting slaving and levelling torques during turns exceeding a predetermined rate without the necessity of utilizing a rate gyro.

I have found that in servoed directional systems, that is, in systems wherein the position or attitude of the inertial elements is repeated remotely by electrical servo mechanisms, there exists a point at which an electrical signal can be derived which is a function of the rate of turn of the craft carrying the system, and I propose to use this signal to operate means for interrupting slaving and levelling torques in the directional system when the rate of turn exceeds a certain predetermined value.

It is therefore another object of this invention to provide a servoed inertial directional system in which a slaving and/or levelling cutoff function is provided by the system itself without the necessity of separate turn-sensing means, thereby resulting in a substantial cost reduction.

The rate-of-turn signal derivable according to this invention can be made directly proportional to the rate of turn of the craft carrying the directional system. It can therefore be utilized in any of several ways to perform turn-responsive functions and its use is not necessarily limited to slaving and/or levelling control.

Accordingly, it is another and more general object of this invention to provide to a turn-responsive means a functional rate-of-turn signal from an inertial directional reference system.

By way of a summary account of but a single aspect of this invention, I provide a compass controlled directional gyroscope system in which a servo-driven follow-up system orients an output shaft to repeat the azimuthal orientation of the gyro rotor structure about its major axis. A control transformer on the output shaft functioning as a compass detector synchro receiver signals from a compass transmitter and compares the orientation of the gyro with the direction of the earth's magnetic field; sensing any lack of correspondence, it controls a torque motor through the medium of a suitable discriminator amplifier to precess the directional gyro back into directional correspondence with the earth's magnetic field. During turns of a craft carrying such a system, the ouput shaft and the servo motor which positions the output shaft both rotate at a speed proportional to the rate of turn of the craft. Utilizing this inherent characteristic of the system, I provide an ordinary tachometer generator driven by the same motor which positions the output shaft. The generator, being driven at a speed proportional to the rate of turn of the craft, develops an output signal on its output winding which is likewise proportional in amplitude to the rate of turn of the aircraft. This signal is applied to a suitable amplifier and rectified and is then used to energize the excitation winding of a relay whose normally closed contacts are in series with the electrical connections to the slaving torque motor. During turns exceeding a certain predetermined rate, depending on the constants of the system, the energization of the relay winding will be of sufficient magnitude to interrupt the slaving operation. With such an arrangement, a simple, readily available, and relatively inexpensive tachometer generator replaces a separate rate gyro required by most precision systems, resulting in a substantial cost reduction without any sacrifice in performance. Furthermore, the electrical constants in a system constructed according to my invention, may be readily altered to provide slaving cut-off at any desired rate of turn.

Although the scope of this invention is not to be limited, except by a fair interpretation of the appended claims, further details thereof, as well as additional objects and advantages, will be better understood in connection with the accompanying drawings, wherein:

Figure 1 is a simplified schematic representation of a compass-controlled directional gyroscope system embodying this invention;

Figure 2 is a schematic representation of another directional gyroscope system illustrating a modification of this invention; and, Figure 3 represents a stabilized platform directional system illustrating a still further modification of this invention.

Figure 3:
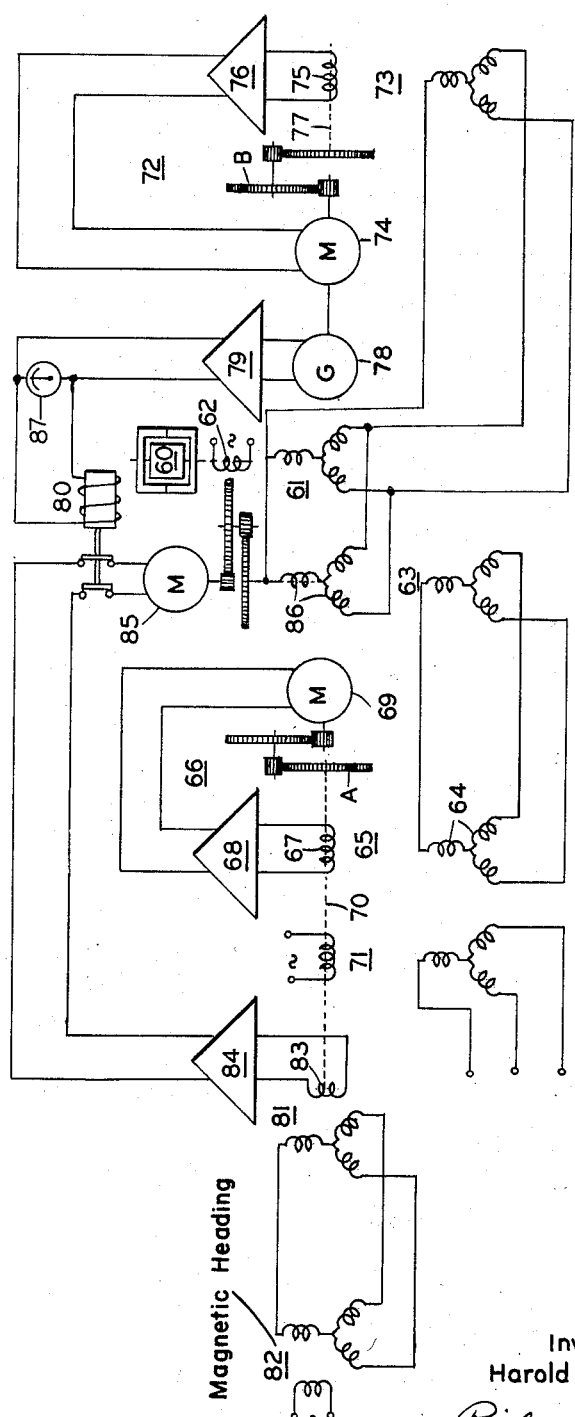

In the accompanying Figure 1 there may be seen a compass transmitter 1 which, through the control means to be described, governs the azimuthal orientation of directional gyroscope 2. In the arrangement shown an excitation winding 3, usually energized by a 400-cycle potential, periodically saturates a magnetic core structure, not shown, to cause the earth's field to produce a second harmonic pattern of signals in the polycircuit windings 4. Because the compass transmitter is normally positioned horizontally, the pattern of signals so produced is related to and characterizes the direction and strength of the horizontal component of the earth's magnetic field. This pattern of signals is repeated across polycircuit windings 5 of compass detector synchro 6. Rotor winding 7 within synchro 6 is so arranged with respect to windings 5 that it derives therefrom a phase- and amplitude-characterized control signal whenever it is caused to depart in one direction or the other from a predetermined orientation with respect to the pattern of potentials existing in windings 5. It is to be understood that if the compass transmitter 1 is caused to rotate in azimuth, a condition obtaining when it is carried by a movable craft in a turn, the field produced by the pattern of signals in windings 5 and 6 will shift. But as long as rotor winding 7 is rotated during turns and retains its position relative to the shifting field, no control signal will be induced therein.

The signal rotor 7 is positioned on output shaft 8 in order to follow the movements of the directional gyroscope 2 by a servo loop to be described below, and the control signal derived as specified is used to slave the gyroscope to a particular azimuthal orientation. Although the slaving and servo-positioning means by which the latter purposes may be accomplished should be familiar to those skilled in the art, their functioning will here be described in order to aid in a proper appreciation of my invention and to clarify certain important relationships between elements of the system.

The directional gyroscope is provided with a position transmitter unit 9 which includes a rotor winding 10, excited from an alternating current source and arranged to rotate in azimuth with the gyro rotor about its output axis. The transmitter unit also includes stator windings 11 which sense the position of rotor winding 10 and transmit signals characterizing its orientation to the stator windings 12 of a servo detector synchro 13. The latter detector synchro includes a rotor winding 14 mounted on output shaft 8 to produce a phase- and amplitude-characterized signal whenever its position does not correspond to that of the gyro. This signal, when amplified through servo amplifier 15, controls a reversible motor 17 so that the rotor winding is driven through gearing arrangement 18 back into positional correspondence with the gyro. When the positions of the directional gyro and rotor winding 14 exactly coincide, no signal is picked up by the rotor winding. It is therefore said to be at a null position. Relative movement of the gyro with respect to the craft on which it is mounted, such as would occur during a turn of the craft or during precessional movements of the gyro rotor structure, will cause the servo motor 17 to drive the output shaft 8 to maintain the rotor winding 14 at a null position following the movements of the gyro. Furthermore, rotor winding 7, also on the output shaft, will similarly repeat the position of the gyroscope. In so doing, rotor winding 7 will continue to derive a phase- and amplitude-characterized control signal in the manner described above whenever the gyroscope departs from a predetermined orientation with respect to the earth's magnetic field. This control signal, when applied to amplifier 19, governs torque motor 21 to cause precessional movements of the gyro in the proper direction to return the gyroscope to its predetermined orientation.

The servo driven output shaft 8 may be used directly to actuate a pointer or other direction indicating mechanism. In the usual case, however, the shaft is provided with one or more synchro transmitters such as that shown at 22 to transmit directional information to a remote location. The rotor winding 23 will therefore be excited from an alternating current source producing in polycircuit windings 24 a pattern of signals which may be telemetered from terminals 25 to a remote position to perform some desired directional function such as radar stabilization, autopilot operation, or for directional indication in a direct presentation system.

In the system so far described, one important characteristic significant for the purposes of this invention may be observed; that is, that because the output shaft 8 is constantly caused to repeat the relative orientation between the craft and the directional gyroscope, it naturally rotates at speeds proportional to the instantaneous rate of turn of the craft upon which the directional gyroscope is mounted. According to these teachings, the rotation of the output shaft is used to govern the output of an electrical signal generator to derive a signal proportional to rate of turn of the craft. The turn signal so developed is then applied to operate a turn responsive means such as a rate-of-turn indicator, for example, or a relay connected to interrupt the application of slaving torques during turns exceeding a predetermined rate. The particular rate at which the output shaft turns would be too small in most cases for the output shaft itself to drive a generator capable of producing any appreciable signal. The geared-down motor 17, however, ordinarily rotates at a much faster rate of speed, which is still proportional to the rate of turn of the craft. According to one embodiment, therefore, I propose to drive the generator directly with the same motor which positions the output shaft.

I am aware that servo systems have in the past been provided with generators driven by a motor within the servo system. Many of these have been applied in directional systems. Heretofore, however, the output of such generators has been returned to the input circuits feeding the servo motor for rate stabilization purposes to prevent or reduce hunting motions of the motor. Lead circuits within amplifiers controlling servo motors have also been provided for the same objective. Although it is also possible to utilize a portion of the generator output in any of the embodiments described herein for rate stabilization of the servo loop, this invention should not be confused with these prior attempts at rate stabilization. These teachings are directed primarily to the application of a rate-of-turn signal to operate turn responsive means such as a slaving control interrupter or a rate-of-turn indicator.

In Figure 1 a generator 26 is provided, whose excitation winding 27 is fed from the same source which supplies the fixed phase signal to motor winding 28. From the output winding 29 of the generator a signal is derived which is proportional to the rate of turn of the craft on which the directional system is mounted. The proportionality between the amplitude of this signal and the rate of turn of the craft may be made linear over as large a range as desired, but the maximum and minimum limits of sensitivity will be determined on the one hand by the torque and speed of response of the motor-generator combination, and on the other hand by threshold sensitivity of the generator. In general, an increase in the rate of turn of the craft is accompanied by an increase in amplitude of the signal. This turn signal, when amplified through a suitable signal amplifier 30, which in effect forms part of the generator means, is used in this instance to control relay 31, the opening of whose contacts interrupts slaving torques applied by the torque motor of the gyro. A simple means for adjusting the sensitivity of the relay is shown in the form of a variable resistance inserted in series with this relay excitation winding. The relay itself may be an A. C. relay or, if it is designed for D. C. excitation, the amplifier 30 may include as part of its circuitry a portion for rectifying the amplified turn signal. Additionally, the amplifier may incorporate circuits providing intergrating or other functions.

Although control of the slaving portion of the directional gyro system has been selected for illustrative purposes, it will be apparent to those versed in the art to which this invention pertains that a similar control may be exerted over the means used to level the directional gyro and the same relay described or another one similarly excited may interrupt levelling torques during turns exceeding a certain predetermined magnitude, the principles and functions being the same in either case. In addition, the cutoff of slaving and levelling is but a specific example of the application which may be made of the functional rate-of-turn signal derivable according to this invention. An alternative and equally practical application would be for the direct indication of rate of turn in a direct presentation panel instrument; the panel instrument itself might comprise a simple galvanometer movement or a tachometer-type instrument calibrated in rates of turn. An advanced type of autopilot system capable of controlling precise maneuvering of an aircraft and including a computer coordinating its functions might well make use of a rate-of-turn signal such as that supplied according to these teachings. As the description proceeds, therefore, it should be recognized that the practice of this invention is not confined to those instances in which the turn signal is responsible for the slaving or levelling operations, but that the rate-of-turn signal may operate other turn-responsive means as well.

In the directional system just described during normal straight flight of an aircraft carrying the system, any wanderings of the directional gyroscope from its predetermined orientation will be sensed through the medium of compass detector 6 which generates a control signal governing the operation of torque motor 21 to return the directional gyroscope to its predetermined heading. During turns of the aircraft, the motor 17 in driving the output shaft 8 at a speed proportional to the rate of turn of the craft, will also cause generator 26 to produce a signal proportional to that rate of turn. If the rate of turn of the craft exceeds a certain predetermined rate, determined by the constants of the system, the signal generated by the signal generating means, including the generator 26 and amplifier 30, will be sufficient to cause energization of relay 31 to interrupt the slaving control during turns when errors are likely to develop in the system. In this embodiment I have shown the generator 26 driven directly by the motor 17 which operates the directional information output shaft 8. It is not essential, though, for the motor 17 to supply the power to drive generator 26 as long as it governs the output of the generator.

In Figure 2 there is shown a directional system in which the generator means may be considered to be governed either by the rotation of the output shaft 8 or of the motor 17, but in this case the power to drive the generator means is supplied by a servo motor in another servo loop. In this embodiment where like numerals indicate portions of the system similar to those in Figure 1, the motor 17 drives the directional information output shaft 8 through a stepped-down gearing arrangement 40, 41, in an intermediate portion of which a synchro transmitter 42 is provided which transmits to synchro detector 43 a signal representing the speed of rotation of synchro rotor 44. The signal picked up by rotor winding 45 is amplified through amplifier 46 and controls the operation of an additional motor 47 to drive the rotor 45 to a null position through the medium of gearing 48. In this manner it will be seen that rotor windings 44 and 45 both rotate at a slower speed than motor 17 but at a more rapid speed than directional information output shaft 8. The speed of rotation, however, is still directly proportional to the speed of motor 17 or of the directional information output shaft 8 and, hence, to the rate of turn of the craft. In driving the output shaft 49 upon which the rotor winding 45 is positioned, the motor 47 also drives generator 50, which, in the manner previously discussed, develops a signal proportional to the rate of turn of the craft. This signal is then amplified through amplifier 51 and applied to relay 52 as before to interrupt the slaving and levelling operations. In addition to the slaving cutoff relay, another turn-responsive means in the form of a rate-of-turn indicator 53 is shown connected in parallel with the relay winding. The indicator is preferably of a type which reads zero at a central position and, if the rate-of-turn signal produced by amplifier 51 is a direct current, a simple galvanometer may be employed. If the amplifier does not have a discriminator circuit as part thereof, some discriminating means would be required in the rate-of-turn indicator.

In Figure 3 a still further embodiment of this invention in a directional system is shown in which the inertial directional reference means comprises a stable platform, shown schematically at 60, instead of the directional gyroscope of Figures 1 and 2. Those familiar with this art are aware that stable platforms may include two or more gyroscope elements suspended on the platform for limited degrees of precessional freedom with respect to it. In the present form of stable platforms the inertial rigidity of the gyroscope elements is not necessarily employed directly to coerce the platform into one particular orientation, but precessional movements of the individual gyroscopes often bring into effect torque motors which rotate the gimbals suspending the platform, thereby maintaining the platform at a relatively stable spatial orientation. The various elements of the stable platform not forming a part of the present invention have been omitted for the sake of clarity and simplification.

As in the case of the directional gyroscope, the stable platform is provided with a position transmitter unit 61 having a rotor winding 62 excited from an alternating current source and arranged to rotate with the platform about its vertical axis. The position-characterizing intelligence signals induced in the stator windings are transmitted through a differential control transformer 63, for purposes to be described, to the stator windings 64 of a servo detector synchro 65 forming part of a servo follow-up loop 66. The resulting control signal induced in rotor winding 67 is amplified by amplifier 68 to power the reversible motor 69 which in turn drives the rotor winding 67 to a null position. In the process the directional information output shaft 70 which carries rotor winding 67 is caused to follow or repeat all the azimuthal movements of the stable platform with respect to the craft, or vice-versa, resulting in directional information in the form of electrical signals being generated by synchro transmitter 71.

In each of the embodiments thus far shown, the description of the operation of the servo followup loop has proceeded in terms of incremental operation as if the detector synchro rotor winding were constantly lagging behind the inertial directional reference means and then catching up with it again. While there is a lag in the operation of any servo loop, depending upon the load on the servo motor, in a high performance servo system such as that employed in any directional system of the sort described herein, the lag is so small, being of the order of a fraction of a degree, that for most purposes it can be ignored. In effect, the directional information output shaft acts substantially instantaneously in following or repeating the azimuthal movements of the inertial directional reference means with respect to the craft and its speed of rotation is therefore proportional to the rate of turn of the craft. This proportionality extends over a wide range of operation, the upper limit of which is determined by the maximum speed of the servo motor.

Another servo loop 72 is provided in the directional system of Figure 3 controlled in precisely the same fashion as servo loop 66, except that its function is somewhat different, and it receives position characterizing signals directly from position transmitter 61 instead of through the differential control transformer 63. Whereas servo loop 66 serves primarily to provide the directional information to output shaft 70, the servo loop 72 operates principally to drive a generating means for providing a functional rate-of-turn signal proportional to the rate of turn of the craft. Servo motor 74, governed by a control signal from rotor winding 75 and amplifier 76, drives the shaft 77 to follow up the movements of the stable platform 60. In this respect shaft 77 is also an output shaft rotating at speeds proportional to the rate of turn of the craft although no directional information is derived from it. In driving output shaft 77, the motor also governs a generating means including a generator 78, which may be of the type illustrated at 26 in Figure 1, and an associated amplifier 79, producing a turn signal proportional to the rate of turn of the craft.

Once again, for illustrative purposes, the turn signal so generated is shown applied to a relay 80 to interrupt the operation of a slaving means. The slaving means employed in this instance, however, does not torque the stable platform back into a position corresponding to the direction of the earth's magnetic field, but instead rotates one of the windings in differential transformer 63 with respect to the other one. When the platform wanders from a predetermined azimuthal orientation, this condition is immediately sensed by the compass detector synchro 81, which receives signals from the earth's field detector 82, and a control signal is produced in the rotor winding 83 which is positioned by the directional information output shaft 70. After being amplified through amplifier 84, the control signal is applied to reversible motor 85 which drives windings 86 of the differential transformer to a new position. The effect of this is electrically to rotate the signals received by servo detector synchro 65 from the position transmitter unit 61, thereby also rotating the output shaft 70 until the rotor winding 83 is again at a null position. Electrically this slaving operation is the equivalent of driving the stable platform in azimuth except, of course, that no torques are reflected back upon the platform. For proper slaving control the motor 85 should drive the differential control transformer at very slow rates. Toward this end a high gear ratio may be used or viscous or eddy current damping of the motor may be employed.

In any measurable turn the rate-of-turn indicator 87 will show both direction and rate of turn by pointer deflection. During turns exceeding a predetermined rate when the slaving means is apt to function erroneously, the relay 80 will be energized sufficiently to open its associated electrical contacts, interrupting the operation of the slaving means. The very small lag which, as previously mentioned, may exist in any servo system is not injurious to the slaving cutout operation but is, in fact, beneficial. For in normal steady flight of an aircraft carrying a directional system of any of the preceding general types, there may be a slight amount of oscillatory yawing which would not adversely affect the slaving operation. The instantaneous accelerations resulting from such yawings may be of sufficient magnitude, however, to constitute rates of turn in excess of the amount necessary to interrupt the slaving function. Consequently, if the servo followup system had no lag in its response, the slaving action might be interrupted during so much of the time that it would not be able to maintain accuracy in the directional information sought. With a small amount of lag in the servo followup system, small oscillatory motions of the craft will average out without resulting in an interruption in slaving control when such interruption is unnecessary.

The practical requirements of any given directional system will largely determine the choice of the particular means to be employed in deriving a rate-of-turn signal. The arrangement shown in Figure 1 has the advantage of immediate response to turns because the generator means is driven directly by the motor driving the directional information output shaft; this motor and its associated output shaft must be capable of repeating substantially instantaneously all relative movements of the directional reference means. At very low rates of turn, however, the arrangement shown in Figure 1 may lack sensitivity. The sensitivity may be improved by increasing the gear ratio between the motor and the output shaft but, all other things being equal, only at the sacrifice of servo speed of response.

To maintain instantaneous accuracy of the directional information and to increase the sensitivity to low rates of turn, recourse may be had to the Figure 3 arrangement with a very high gear ratio provided at B in order to drive the generator means at a high rate of speed. With the increased sensitivity in the rate-of-turn detection there may result a significant lag in the response of output shaft 77, principally at very high rates of turn, and it is even possible that, if a high rate of turn were maintained for a long enough period, the output shaft 77 might lag a full 180° behind its synchronous position. Immediately following turns there would then be a period during which the generator means would continue to produce a signal until the output shaft 77 could catch up with its synchronous position. These observations are of course predicated upon the use of identical components in each system, for it will be recognized that varying the power ratings of the motors and amplifiers will also affect sensitivity and speed of response. Utilizing identical or nearly the same components, however, the system shown in Figure 1 will be seen to have a greater immediacy of response than that of Figure 3 and the Figure 3 arrangement will have the greater sensitivity.

To combine advantages of both the systems shown in Figures 1 and 3, the arrangement in Figure 2 represents a desirable alternative. Since the output shaft 49 rotates at a speed faster than that of output shaft 8, it is not necessary to have a very high gear ratio at 48 for the motor 47 to drive the generator means rapidly enough to develop a usable turn signal at low rates of turn. A high degree of sensitivity will therefore be the result. Furthermore, the amount by which the output shaft 49 lags behind in following up the relative movements of the inertial directional reference means will be decreased by an amount determined by the gear ratio at 41. The greater the gear ratio at 41, the smaller need be the gear ratio at 48 to maintain the same sensitivity; hence, the motor 47 with less load upon it will have a faster response. Practical considerations of mechanical inertias in the servo loops will determine the optimum gear ratios to be used at various points in the directional system.

At this point it will have been apparent that the various specific embodiments described herein are offered as purely illustrative in nature and that they should not necessarily be taken as limiting on the invention disclosed herein. Many other modifications within the scope of these teachings in addition to those already depicted will doubtless occur to those skilled in the art to which this disclosure pertains.

What I claim as new and desire to secure by Letters Patent of the United States is:

1. A directional system for movable craft comprising: inertial directional reference means maintaining a stable spatial orientation; a rotatable output shaft; a servo loop sensitive to the relative azimuthal orientation between said craft and said directional reference means for driving said shaft at speeds proportional to the rate of turn of said craft; generator means governed by the rate of rotation of said output shaft for producing an electrical rate-of-turn signal varying with said rate of turn; and turn responsive means operated by said rate-of-turn signal.

2. A directional system to be carried by a movable craft comprising: inertial directional reference means maintaining a stable spatial orientation; an output shaft; means responsive to the relative orientation between said craft and said directional reference means and including motor means operatively connected to drive said shaft at speeds proportional to the rate of turn of said craft; generator means governed by said motor means for producing an electrical turn signal varying with said rate of turn; and turn responsive means operated by said turn signal.

3. A directional system for providing directional information on a movable craft comprising: inertial directional reference means maintaining a stable spatial orientation; an output shaft; means responsive to the relative orientation between said craft and said directional reference means and including motor means operatively connected to drive said shaft at speeds proportional to the rate of turn of said craft; generator means governed by said motor means for producing an electrical turn signal varying with said rate of turn; slaving control means for correcting the directional information derived from said directional system upon departure of said reference means from a predetermined orientation; and means responsive to said turn signal for interrupting the operation of said slaving control means when said turn signal exceeds a predetermined amplitude.

4. A directional system for movable craft comprising: inertial directional reference means maintaining a stable spatial orientation; a servo-driven followup arrangement for deriving directional information from said directional reference means including a directional information output shaft, motor means drivably connected to said shaft, and means sensitive to the relative azimuthal orientation between said craft and said directional reference means for causing said motor means to position said output shaft to repeat said relative orientation; generator means governed by the rate of operation of said motor means for producing an electrical rate-of-turn signal varying with the rate of turn of said craft; and turn responsive means operated by said signal.

5. A directional system for movable craft comprising: inertial directional reference means maintaining a stable spatial orientation; a servo-driven followup arrangement for deriving directional information from said directional reference means including a directional information output shaft, motor means drivably connected to said shaft, and means sensitive to the relative azimuthal orientation between said craft and said directional reference means for causing said motor means to position said output shaft to repeat said relative orientation; generator means governed by the rate of operation of said motor means for producing an electrical rate-of-turn signal varying with the rate of turn of said craft; slaving control means for correcting said directional information derived from said followup arrangement upon departure of said directional reference means from a predetermined azimuthal orientation; and means responsive to said rate-of-turn signal for interrupting the operation of said slaving control means when said rate-of-turn signal exceeds a predetermined amplitude.

6. A directional system for movable craft comprising: inertial directional reference means maintaining a stable spatial orientation; a rotatable output shaft; a servo loop sensitive to the relative azimuthal orientation between said craft and said directional reference means for positioning said output shaft to follow up said relative orientation; generator means governed by the rate of rotation of said output shaft for producing an electrical rate-of-turn signal varying with the rate of turn of said craft; and turn responsive means operated by said rate-of-turn signal.

7. A directional system for movable craft comprising: inertial directional reference means maintaining a stable spatial orientation; a servo loop sensitive to the relative azimuthal orientation between said craft and said directional reference means and including a servo-driven output shaft for following up said relative orientation; generator means governed by the rate of rotation of said shaft to produce an electrical rate-of-turn signal proportional to the rate of turn of said craft; and turn responsive means operated by said signal.

8. A directional system to be carried by a movable craft comprising: inertial directional reference means maintaining a stable spatial orientation; means for repeating at a remote location the relative orientation of said reference means and said craft including signal generating means producing control signals characterizing said relative orientation, an output shaft for repeating said relative orientation, and motor means governed by said control signals for orienting said output shaft to correspond with said relative orientation; generator means governed by said motor means for producing a rate-of-turn signal varying with the rate of turn of said craft; and means operated by said rate-of-turn signal for performing an operation depending upon the rate of turn of said craft.

9. A directional system to be carried by a movable craft comprising: inertial directional reference means maintaining a stable spatial orientation; means for repeating at a remote location the relative orientation of said reference means and said craft including signal generating means producing control signals characterizing said relative orientation, an output shaft for repeating said relative orientation, and motor means governed by said control signals for orienting said output shaft to correspond with said relative orientation; means for sensing departure of said reference means from a predetermined spatial orientation; slaving means controlled by said sensing means for causing said output shaft to be repositioned; generator means governed by said motor means for producing a rate-of-turn signal varying with the rate of turn of said craft; means responsive to said rate-of-turn signal for interrupting the operation of said slaving means during turns of said craft exceeding a predetermined rate.

References Cited in the file of this patent
UNITED STATES PATENTS

| 2,453,451 | Moseley | Nov. 9, 1948 |
| 2,710,156 | Stone | June 7, 1955 |
| 2,808,656 | Pirone | Oct. 8, 1957 |